United States Patent [19]

Slovinsky et al.

[11] 4,332,696
[45] Jun. 1, 1982

[54] FATTY EPOXIDE HYDROPHOBIZED SILICA AS ANTIFOAMS IN BROWNSTOCK WASHING AIDS

[75] Inventors: Manuel Slovinsky, Woodridge; Joseph A. Maciaszek, Naperville, both of Ill.

[73] Assignee: Nalco Chemical Company, Oak Brook, Ill.

[21] Appl. No.: 153,512

[22] Filed: May 27, 1980

[51] Int. Cl.³ .................. B01D 19/04; B05D 3/02; B05D 7/00
[52] U.S. Cl. .................. 252/321; 106/308 F; 252/358; 427/220; 427/386
[58] Field of Search ............. 252/321, 358; 427/220, 427/386; 106/308 F

[56] References Cited

U.S. PATENT DOCUMENTS

| | | | |
|---|---|---|---|
| 2,657,149 | 10/1953 | Iler | 106/308 F |
| 2,776,910 | 1/1957 | Erickson et al. | 427/386 X |
| 3,076,768 | 2/1963 | Boylan | 252/358 |
| 3,304,266 | 2/1967 | Sullivan | 252/358 |
| 3,408,306 | 10/1968 | Boylan | 252/321 |
| 3,887,487 | 6/1975 | Camp et al. | 252/321 |
| 3,923,683 | 12/1975 | Michalski et al. | 252/321 |
| 4,021,365 | 5/1977 | Sinka et al. | 252/321 |

*Primary Examiner*—Richard D. Lovering
*Attorney, Agent, or Firm*—John G. Premo; Robert A. Miller

[57] ABSTRACT

An improved aqueous defoamer composition of the type comprising from 70–90% by weight of a water-insoluble organic liquid, from 0.1 to about 20% of a hydrophobic silica suspended in the organic liquid, and from about 1 to about 20% of an oil-soluble spreading agent, the improvement which comprises utilizing as the hydrophobic silica a silica which has at least a portion of its surface esterified with a fatty epoxide.

The invention also contemplates an improved method for hydrophobizing silica particles by reacting them in an organic liquid with a fatty epoxide.

5 Claims, No Drawings

FATTY EPOXIDE HYDROPHOBIZED SILICA AS ANTIFOAMS IN BROWNSTOCK WASHING AIDS

INTRODUCTION

U.S. Pat. No. 3,076,768 deals with defoaming compositions useful in defoaming a wide variety of aqueous systems, particularly paper mill systems. These defoaming compositions are defined by the patentee as containing 80–97% by weight of a water-insoluble organic liquid, 3–20% of a hydrophobic silica, and 0.05–5% of a spreading agent. The primary active ingredient in these formulas is the hydrophobic silica. These hydrophobic silicas are usually prepared by reacting finely divided hydrophilic silica with a silane such as dichlorodimethyl silane or with a silicone polymer to produce a hydrophobic coating on the surface of the silica particles. Silanes and silicone polymers are expensive chemicals of commerce and contribute greatly to the cost of the above described defoaming products.

If it were possible to produce defoaming compositions of the type described in U.S. Pat. No. 3,076,768, the disclosure of which is incorporated herein by reference, an advance would be made in the art.

THE INVENTION

An improved aqueous defoamer composition of the type comprising from 70–98% by weight of a water-insoluble organic liquid, from 0.1 to about 20% by weight of a hydrophobic silica suspended in the organic liquid, and from about 1 to about 20% by weight of an oil-soluble spreading agent, the improvement which comprises utilizing as the hydrophobic silica a silica which has at least a portion of its surface esterified with a fatty alcohol.

The Fatty Component of the Hydrophobic Silica

The invention comprises reacting at least 30% by weight of the hydrophilic silica with either a fatty alcohol or an alpha beta fatty epoxide to surface esterify the silanol groups of the hydrophilic silica particles. Finely divided hydrophilic silicas which have been reacted with fatty alcohols to surface esterify the silanol groups is the subject of Iler, U.S. Pat. No. 2,657,149. This patent is incorporated herein by reference.

It has been found that improved hydrophobic silicas are afforded by taking the starting hydrophilic particles and reacting them in an appropriate organic liquid with a fatty alpha beta epoxide for about 2 hours at a temperature of about 150° C. These reaction conditions produce a surface modified silica that is hydrophobic and is useful in defoaming a wide variety of aqueous systems when formulated as described above.

The fatty groups referred to above contain at least 12 carbon atoms and, preferably, contain 18 or more carbon atoms.

The Organic Liquids

The organic liquids that may be used in preparing the esterified silicas should be non-reactive with the alcohols or epoxides and, preferably, are petroleum-based or derived hydrocarbon liquids such as the well-known paraffin oils.

Other organic liquids that may be used are described in U.S. Pat. No. 3,076,768.

The Spreading Agents

The spreading agents used in commercial formulas usually are oil-soluble surfactants. They are described in U.S. Pat. No. 3,076,768.

The Starting Hydrophilic Silicas

Any number of hydrophilic silicas may be used for purposes of producing the compositions of the invention. A particularly useful material has the following specifications:

| Hydrophilic Silica A | |
|---|---|
| Bulk Density | 9–12 lbs./cu. ft. |
| Density, 25° C. | 2 gms./ml. |
| Form | Powder |
| Mean Particle Diameter | 14–22 Millimicrons |
| Oil Absorption | 180–200 gms./100 gms. |
| Refractive Index | 1.44 |
| Surface Area, B.E.T. | 120–150 $M^2/g$. |

Free silicone oils may also be used in the formulas in amounts ranging from 0.1–5% by weight.

Ethylene Bis Stearamide

Ethylene bis stearamide is a useful ingredient for incorporation into the compositions used in the practice of this invention. They are used in the finished formula in amounts ranging between 1–20% and, preferably, 5–10%. Their use in defoamers is described in U.S. Pat. Nos. 3,923,683 and 4,021,365, the disclosures of which are incorporated herein by reference.

The amount of fatty alcohol used to modify the hydrophilic silicas to render them hydrophobic will be at least 5% by weight of the fatty alcohol based on the weight of the hydrophilic silica. A preferred amount is at least 30% by weight, with amounts of 100% or more giving good results.

THE EXAMPLES

To evaluate the improved hydrophobic silicas taught by this invention vs. the prior art, a laboratory antifoam test was used. In this test, a graduated cylinder is firmly held by a Teflon pad. This cylinder contains 50 ml of an alkaline solution of a water-soluble monomer surfactant. On mechanical shaking for a standard period of time (14 sec.) a certain volume of foam is being formed. This foam takes a very long time to collapse. The effectiveness of antifoam compositions is measured here by the time it takes for the foam to collapse when the tested material is present in the system. Also, as the same charge is shaken again several times, it is normally observed that the time of collapse increases. This measures the decrease in activity of the preparation with use and is presumably a reflection of the persistence of the hydrophobizing system on the silica particles. When the time of collapse of the foam takes more than 30 seconds, the test is interrupted and the number of cycles counted. The more cycles, the better.

The following data shows some testing results on formulations containing hydrophilic silicas hydrophobized with different materials.

| Hydrophilic Silica A treated with | Wt. % on Silica | No. of Cycles |
|---|---|---|
| A silicone liquid | 30 | 7 |
| Another silicone fluid | 30 | 4 |

| Hydrophilic Silica A treated with | Wt. % on Silica | No. of Cycles |
|---|---|---|
| $C_{20}$ + mixed alcohol | 100 | 9 |
| $C_{15-18}$ Epoxide | 30 | 8 |

The above data shows that treatment of silica with the $C_{15-18}$ epoxide gives longer lasting effect as compared with silica treated with the silicone products. In the case of $C_{20}$ mixed alcohol, a 100% treatment gives longer permanence than the epoxide. This may reflect the effect of a larger dosage treatment.

We claim:

1. A method of preparing a hydrophobic silica which comprises reacting a hydrophilic silica with at least 30% by weight of a fatty epoxide in an organic liquid for at least 2 hours at about 150° C.

2. In an improved aqueous defoamer composition of the type comprising 70–98% by weight of a water-insoluble organic liquid, from 0.1 to about 20% of a hydrophobic silica suspended in the organic liquid, and from about 1 to about 20% of a oil-soluble spreading agent, the improvement which comprises utilizing as the hydrophobic silica a silica which had at least a portion of its surface esterified with an alpha-beta fatty epoxide.

3. The composition of claim 2 wherein the alpha-beta fatty epoxide contains from 15 to 18 carbon atoms.

4. The method of defoaming aqueous systems which comprises adding to said systems a defoaming amount of the composition of claim 2.

5. The method of defoaming aqueous systems which comprises adding to said systems a defoaming amount of the composition of claim 3.

* * * * *